UNITED STATES PATENT OFFICE.

WM. HARTLEY MILLER AND IVON BRUCE MILLER, OF PHILADELPHIA, PA.

IMPROVEMENT IN LUBRICATING THE PACKING OF STUFFING-BOXES, &c.

Specification forming part of Letters Patent No. 47,170, dated April 4, 1865.

*To all whom it may concern:*

Be it known that we, WILLIAM HARTLEY MILLER and IVON BRUCE MILLER, of the city of Philadelphia, in the county of Philadelphia, in the State of Pennsylvania, have invented a new and improved mode of lubricating the stuffing-box of the steam-engine and pump, and of making the packing thereof water-proof and more durable, while the rod that passes through the stuffing-box will have less friction on account of the said lubricating mode or material. It may be used for other joints and other machinery; and we do hereby declare that the following is a full and exact description thereof.

The nature of our invention consists in the application of paraffine to the stuffing-box or other joint of the steam-engine or other machinery by admixture of it with other materials used in packing—as cotton, for instance; or it may be used alone; but in all cases it is subject to conditions, as in the application of it to any manufactured article of packing the mode of must depend upon the requirements of the case, so that it will lubricate the frictional surface, preserve the packing from decay, and add to the security of the joint.

To enable others skilled in the art to make and use our invention, we will proceed to describe its construction and mode of operation.

The paraffine is that residuum of kerosene-oil or petroleum that is made in the form of wax for candles and other purposes. Petrolia is another name for substantially the same thing, both being a residue or extract from coal-oil. Make a composition of paraffine, cotton, or hemp, and you have cotton and hemp more durable than heretofore known. Apply the paraffine to the frictional surface of any packing in the stuffing-box, and you have less friction; hence we apply it to all packings, and by melting it, pouring it, or by softening it by gentle heat and compressing it into the required form; or it may be broken, or chipped, or grated when cold. A thorough saturation is necessary where there is water or condensed steam in the joint. In some other cases the coating of the outer surface is necessary only. Where the applications are required, ready methods suggesst themselves. We apply it by passing the packing-rope through the paraffine in a melted state. When it cools a coating of wax remains upon the surface. It may be applied between layers of fibrous material.

What we claim as our invention, and desire to secure by Letters Patent, is—

1. The application of the substance, mode, and material above described to the stuffing-boxes or other joints of engines or other machinery, or any other substantially the same mode and material.

2. The application of the above material to other materials used for the manufacture of packing, as cotton and hemp saturated with it.

3. The application of the above material, or any other substantially the same, to the rod or stuffing-box, or to the packing thereof, by using it through the cylinder of the engine, or any other application thereof whereby the rod will carry the said material to the packing.

4. The substance above described as an adjunct to the various packings.

5. The mode and material above described, or any other substantially the same and that will produce the intended effect, as a cover or coating in place of muslin or other material for rope packing, as applicable in the packing made of powdered and fibrous substance, for instance.

6. The above-described material as applied to the packing of pistons of engines and pumps.

WILLIAM HARTLEY MILLER.
IVON BRUCE MILLER.

Witnesses:
ANDW. J. BOSWELL,
E. W. MILLER.